(12) United States Patent
Thijssen et al.

(10) Patent No.: US 7,859,962 B2
(45) Date of Patent: Dec. 28, 2010

(54) SEAMLESS RECORDING OF REAL-TIME INFORMATION

(75) Inventors: Paulus Thomas Arnoldus Thijssen, Eindhoven (NL); Eric Frans Christiaan Josef Marie Tijssen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1060 days.

(21) Appl. No.: 11/568,119

(22) PCT Filed: Apr. 20, 2005

(86) PCT No.: PCT/IB2005/051286

§ 371 (c)(1), (2), (4) Date: Oct. 20, 2006

(87) PCT Pub. No.: WO2005/104123

PCT Pub. Date: Nov. 3, 2005

(65) Prior Publication Data

US 2009/0154317 A1    Jun. 18, 2009

(30) Foreign Application Priority Data

Apr. 23, 2004   (EP) .................... 04101690

(51) Int. Cl.
*G11B 7/00* (2006.01)
(52) U.S. Cl. .................. 369/47.33; 369/47.11
(58) Field of Classification Search ........... None
See application file for complete search history.

(56) References Cited

U.S. PATENT DOCUMENTS

| | | | | |
|---|---|---|---|---|
| 5,276,662 A | * | 1/1994 | Shaver et al. | 711/4 |
| 5,289,440 A | * | 2/1994 | Bakx | 369/30.23 |
| 5,453,967 A | * | 9/1995 | Aramaki et al. | 369/47.11 |
| 5,463,607 A | | 10/1995 | Roth et al. | |
| 5,502,700 A | * | 3/1996 | Shinada | 369/47.11 |

(Continued)

FOREIGN PATENT DOCUMENTS

WO   9816014 A1   4/1998

OTHER PUBLICATIONS

Anonymous: Information Technology-SCSI-3, Block Commands (SBC), Editors Proposed Proposed Working Draft, Jul. 5, 2000, pp. 36-38, XP002385645.

(Continued)

*Primary Examiner*—Peter Vincent Agustin

(57) ABSTRACT

A device seamlessly records real-time information on a record carrier in a track on a recording layer via a beam of radiation. The device has a real-time information buffer and an interface for transfer of real-time information and commands between a source and the recording means. While recording the real-time information, the device detects (42) an inability to write information on the record carrier for a period exceeding (43) a local realtime information buffering capacity of the real-time information buffer. If so, a stop command is sent (44) to the source for temporarily interrupting the transfer of real-time information. After the device detects that said inability has ended (45), a resume command is sent (46) to the source for resuming the transfer of real-time information. Hence seamless recording is provided without a need for a large buffer, in particular in the event of a layer jump when recording on a multilayer optical disc.

10 Claims, 3 Drawing Sheets

U.S. PATENT DOCUMENTS

Figure 1:
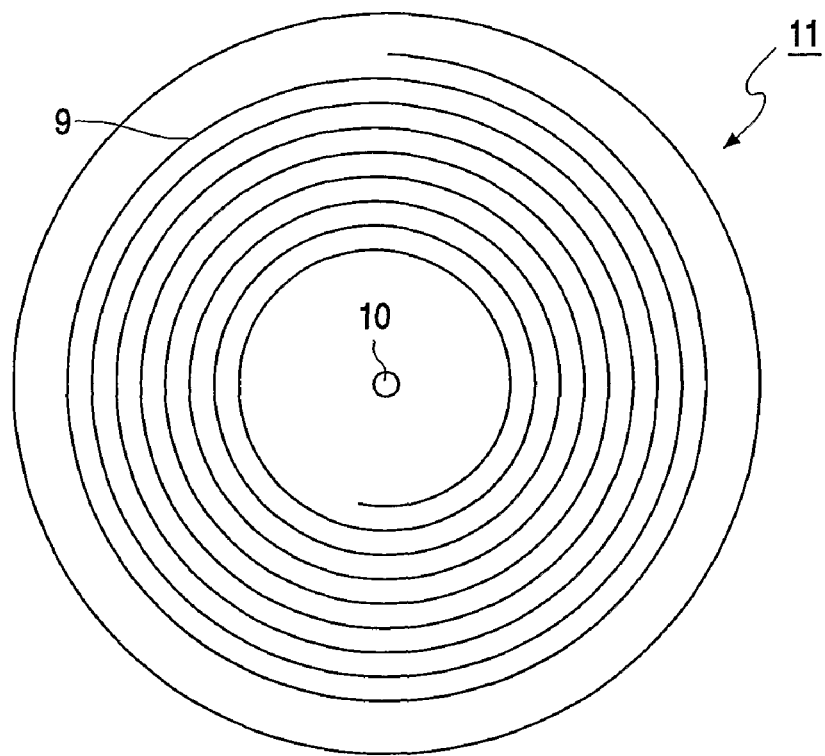

| | | | |
|---|---|---|---|
| 5,905,945 | A | 5/1999 | Hill et al. |
| 5,923,869 | A | 7/1999 | Kashiwagi et al. |
| 6,504,996 | B1 | 1/2003 | Na et al. |
| 6,538,962 | B2 * | 3/2003 | Hyun ................... 369/30.23 |
| 6,584,278 | B2 | 6/2003 | Ando et al. |
| 6,731,577 | B2 * | 5/2004 | Suzuki ................. 369/47.33 |
| 6,795,382 | B2 * | 9/2004 | Kitamura et al. ......... 369/47.11 |
| 6,879,552 | B2 * | 4/2005 | Kase ................... 369/47.11 |
| 7,196,990 | B2 * | 3/2007 | Yamamoto ............. 369/53.18 |
| 2001/0006498 | A1 * | 7/2001 | Hayashi et al. ......... 369/47.33 |
| 2002/0031063 | A1 | 3/2002 | Kojima |
| 2002/0041554 | A1 * | 4/2002 | Kitamura et al. ......... 369/53.37 |
| 2002/0060961 | A1 * | 5/2002 | Yamamoto ............. 369/47.11 |
| 2002/0060962 | A1 * | 5/2002 | Kase ................... 369/47.11 |
| 2002/0126595 | A1 | 9/2002 | Hogan |

OTHER PUBLICATIONS

Stephen F. Nathans: eMEDIALIVE, Building and Burning Dual-Layer DVD, Internet Article, Apr. 12, 2004, XP002385644.

"TA Document 2001017 AV/C Tape Recorder/Player Subunit Specifications 2.2", 1394 Trade Association, Dec. 11, 2001, IEEE STD 1394-1995.

* cited by examiner

SEAMLESS RECORDING OF REAL-TIME INFORMATION

The invention relates to a device for recording real-time information on a record carrier in a track on a recording layer via a beam of radiation, the device comprising recording means for recording real-time information, which recording means include a head for providing the beam of radiation and a real-time information buffer.

The invention further relates to a method of recording real-time information from a source on a record carrier in a track on a recording layer via a beam of radiation.

The invention further relates to a computer program product for recording information on the record carrier.

In particular the invention relates to seamlessly recording real-time information on dual layer or multi layer optical discs.

Known optical disc recording devices for recording real-time information, such as a DVD+RW video recorder, are equipped to receive the real-time information via an input unit containing a real-time information buffer. The real-time information buffer is arranged for temporarily storing the real-time information for providing a continuous recording capability. Nowadays recording devices for recording data on multilayer optical discs are being proposed.

A multilayer optical recording medium is known from US Patent Application US 2002/0031063. The record carrier has a plurality of recording layers that each comprise a guide groove, usually called pregroove, for indicating the position of tracks in which the information is to be represented by recording optically readable marks. The pregroove is meandering by a periodic excursion of the track in a transverse direction (further denoted as wobble). A recording device is provided with a head for generating a beam of radiation for scanning the track. The marks are detected during said scanning by variations of the reflectivity of the scanned surface.

A problem of the known recording devices is that there may be periods in which no data can be written to the record carrier. Nevertheless the real-time information will be continuously transferred from a source device to the recording device, in particular to the real-time information buffer. Hence a large real-time information buffer is required, which is expensive.

Therefore it is an object of the invention to provide a system for recording real-time information in which the size of the real-time information buffer is reduced.

According to a first aspect of the invention the object is achieved with a device for recording information as described in the opening paragraph, the device comprising an interface for transfer of real-time information and control data between a source and the recording means, the control data including commands, and a control unit for, while recording the real-time information, detecting an inability to write information on the record carrier for a period exceeding a local real-time information buffering capacity of the real-time information buffer, sending a stop command to the source for temporarily interrupting the transfer of real-time information from the source, and sending a resume command to the source for resuming the transfer of real-time information after detecting that said inability has ended.

According to a second aspect of the invention the object is achieved with a method of recording information on the record carrier as described in the opening paragraph, the method comprising detecting, while recording the real-time information, an inability to write information on the record carrier for a period exceeding a local real-time information buffering capacity, sending a stop command to the source for temporarily interrupting transfer of real-time information from the source, and sending a resume command to the source for resuming the transfer of real-time information after detecting that said inability has ended.

Small interruptions of the writing function may be masked by the real-time information buffer. However, the inability to write information is to be detected by predicting if such interruption will be longer than a period which can be masked by the local real-time information buffering capacity, which may be very limited for a low cost device. An interruption exceeding the buffering capacity would otherwise result in overflow of the real-time information buffer, and loss of data. Detecting such an interruption may depend on a type of interruption, and may involve predicting the period of interruption, the data rate, the response time of the source device on the stop command, and other parameters, to allow timely sending the stop command. The effect of the measures is that the source is forced to interrupt transferring the real-time information, and resume the data transfer as soon as the recording device is again capable of recording. This has the advantage that seamless recording is achieved, i.e. a virtually continuous real-time information recorded area is provided on the record carrier, even in the presence of local or temporary interruptions of the writing function. Moreover, the size of the real-time information buffer in the recording device may be small, e.g. just sufficient to cope with small interruptions or differences in transfer speed and recording speed. No large real-time information buffer for longer interruptions is required.

The invention is also based on the following recognition. During recording there may be periods that no data can be written on the record carrier. The inventors have seen that such periods may be quite long, e.g. when data has to be recorded again or on a different location due to recording errors, or when starting recording on a different layer. In particular such periods may be substantially longer during recording than during reading data. For reading usually some real-time information buffering capacity will be present in the device, which capacity may be shared for recording. However, for obviating the inconvenient recording interruptions, an exceptionally large real-time information buffer would be needed for recording only. As noted by the inventors, many source devices are capable of interrupting the data transfer without additional cost. For example, a source digital video camcorder (DVC) can easily temporarily go to a pause mode, and resume data transfer after the resume command. A personal computer (PC) as source device will usually have sufficient memory to temporarily store real-time information. Hence, by including the interface and issuing the stop and resume commands, the existing real-time information interruption or buffering capability of the source device is used to reduce the need for a large buffer in the recording device.

In an embodiment of the device, for a record carrier comprising at least a first recording layer and a second recording layer, the control unit is arranged for said detecting the inability by detecting that a transition from a current writing position of the beam on a current recording layer to next writing position of the beam on a different recording layer has to be performed, which transition requires a period exceeding the local real-time information buffering capacity. This has the advantage that the user has avail of a single virtually continuous recording space spanning the first and second layer.

In an embodiment of the device the control unit is arranged for said detecting the inability by detecting that write errors have occurred which require an error recovery process, which process requires a period exceeding the local real-time information buffering capacity. It is noted that error recovery may be organized according to a predefined standard recording format, which may require (re-)writing data at different locations on the record carrier or further defect management operations. Hence, while knowing the required error recovery process, the inability to write data for a period can be predicted.

In an embodiment of the device the control unit is arranged for said sending the stop command based on detecting buffer fullness of the real-time information buffer above a predetermined threshold. This has the advantage that the urgency for stopping the transfer of real-time information from the source can be easily detected, irrespective of the reason or the type of incapability of writing.

Further preferred embodiments of the device according to the invention are given in the appended claims, disclosure of which is incorporated herein by reference.

Figure 2:
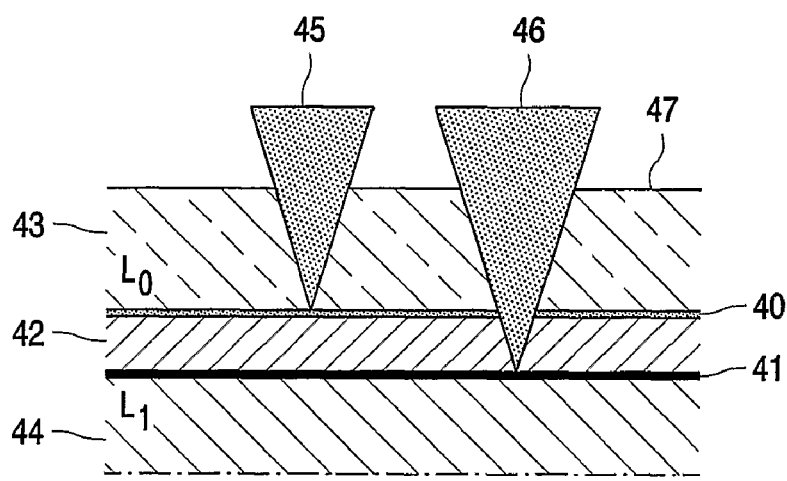
Figure 3:
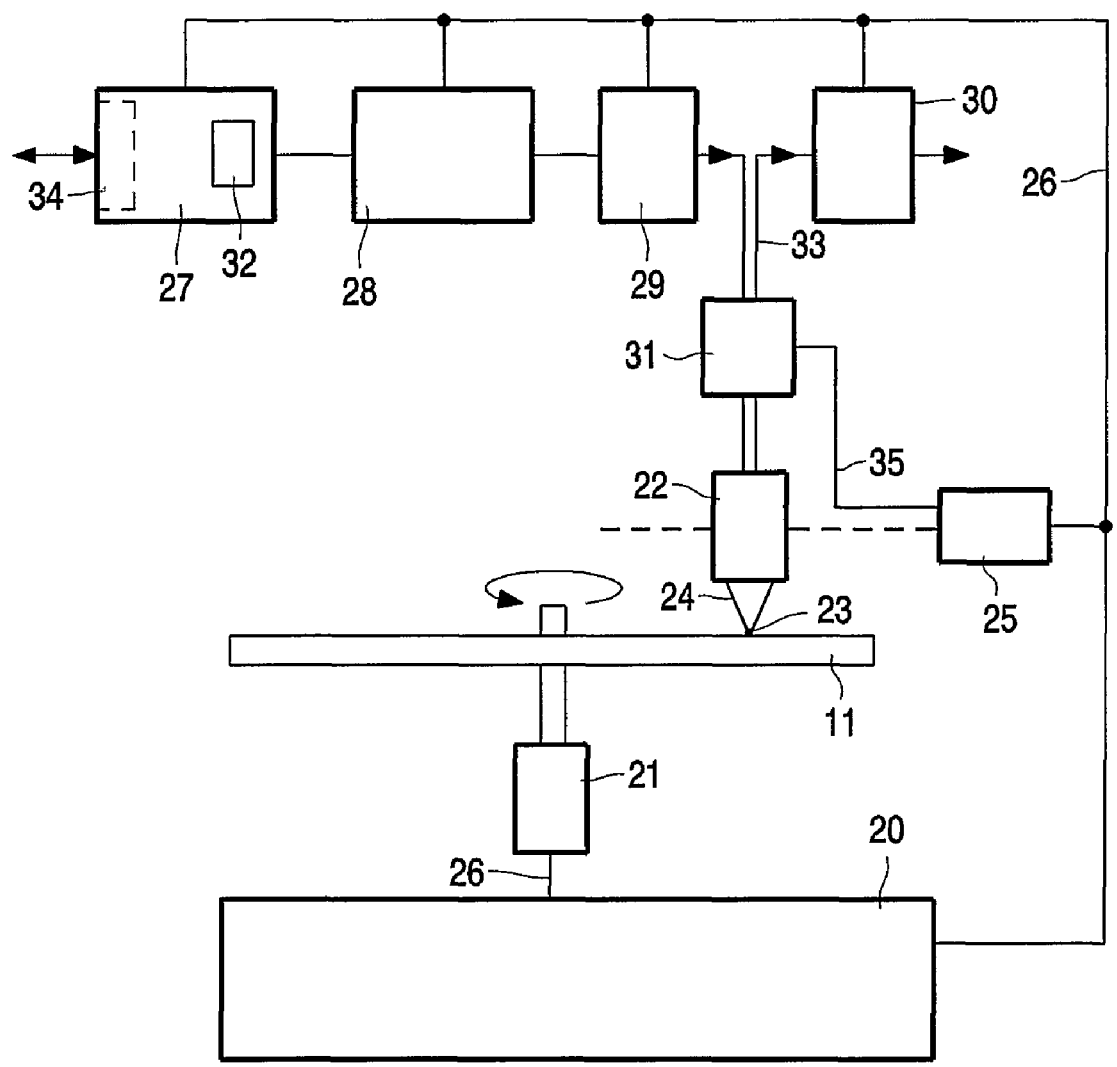
Figure 4:
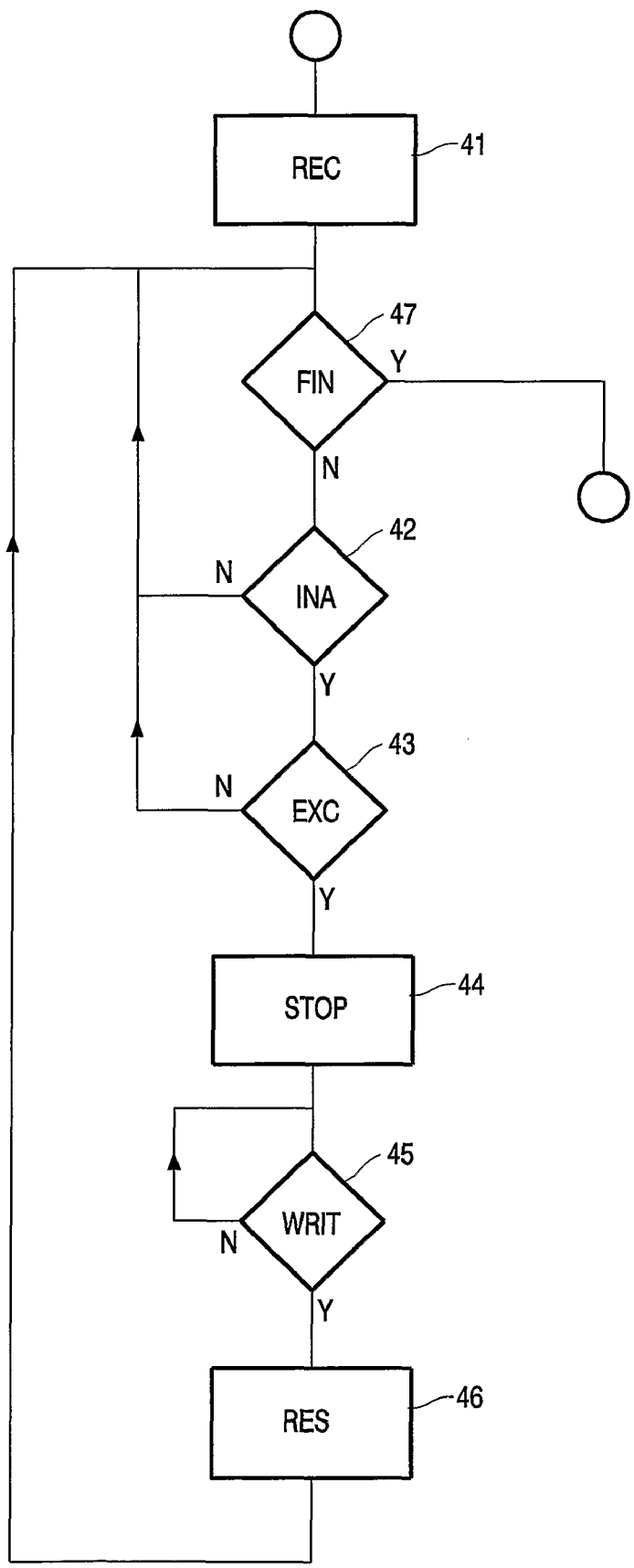

These and other aspects of the invention will be apparent from and elucidated further with reference to the embodiments described by way of example in the following description and with reference to the accompanying drawings, in which FIG. 1 shows a disc-shaped record carrier, FIG. 2 shows a multilayer optical disc, FIG. 3 shows a recording device for seamless recording of real-time information, and FIG. 4 shows a control process for seamlessly recording.

In the Figures, elements which correspond to elements already described have the same reference numerals.

FIG. 1 shows a disc-shaped record carrier 11 having a track 9 and a central hole 10. The track 9 is arranged in accordance with a spiral pattern of turns constituting substantially parallel tracks on an information layer. The record carrier may be an optical disc of a recordable type, and has at least two recordable information layers. Examples of a recordable disc are the CD-R and CD-RW, and the DVD+RW and DVD+R, and the DVD-RW and DVD-R. The track 9 is indicated by a pre-track structure provided during manufacture of the blank record carrier, for example a pregroove. The pregroove enables a read/write head to follow the track 9 during scanning. The pregroove may be implemented as an indentation or an elevation, or may consist of a material having a different optical property than the material of the pregroove. The pre-track structure may also be formed by regularly spread subtracks or pre-pits which periodically cause servo signals to occur. Recorded information is represented on the layer by optically detectable marks written along the track by a beam of radiation, usually a laser beam. The marks are constituted by variations of a physical parameter and thereby have different optical properties than their surroundings, e.g. in the form of areas with a reflection coefficient different from their surroundings, obtained when recording in materials such as dye, alloy or phase change material, or in the form of areas with a direction of polarization different from their surroundings, obtained when recording in magneto-optical material. During reading the marks are detectable by variations in the reflected beam, e.g. variations in reflection. The record carrier may be intended to carry real-time information, for example video or audio information, or other information, such as computer data.

The system of recording information also relates to a multilayer record carrier having at least two layers recordable from the same side of the record carrier. In DVD the first recording layer (called L0, indicating the layer being first in a logical recording order) is located at a position closer to the entrance face of the beam than the second recording layer (called L1). It is noted that 'upper' layer indicates the layer closest to the entrance face of the laser beam, and 'lower' indicates a layer farther away from the entrance face of the laser beam, which in practice may be the top or bottom the record carrier depending on the location of the laser. Alternatively the first recording layer L0 may be the lower layer, while L1 and further upper layers (if any) are located closer to the entrance side.

FIG. 2 shows a multilayer optical disc. L0 is a first recording layer 40 and L1 is a second recording layer 41. A first transparent layer 43 covers the first recording layer, a spacer layer 42 separates both recording layers 40,41 and a substrate layer 44 is shown below the second recording layer 41. The first (or upper) recording layer 40 is located at a position closer to an entrance face 47 of the record carrier than the second (or lower) recording layer 41. A laser beam is shown in a first state 45 focused on the L0 layer and the laser beam is shown in a second state 46 focused at the L1 layer.

Multilayer discs are already available as read-only pre-recorded discs, such as DVD-ROM or DVD-Video. A dual layer DVD+R disc has recently been proposed, which disc is to be compatible with the dual layer DVD-ROM standard. The reflection levels of both layers are >18%. The L0 layer has a transmission around 50-70%. A spacer layer separates the layers with a typical thickness between 30 and 60 μm. The L1 layer has a high reflection and needs to be very sensitive. Also rewritable dual-layer discs are proposed. The rewritable L0 layer has a transmission around 40-60%. The effective reflection of both layers is typically 7% although lower and higher values are possible (3%-18%). Writable and rewritable optical storage media having 3 or more recording layers are considered also.

FIG. 3 shows a recording device for seamless recording of real-time information. The device is provided with scanning means for scanning a track on a record carrier 11 which means include a drive unit 21 for rotating the record carrier 11, a head 22, a servo unit 25 for positioning the head 22 on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head may contain all optical elements, the laser and detectors as an integrated unit, usually called Optical Pickup Unit (OPU), or may contain as a movable unit only some of the optical elements, while the remaining optical elements and laser and detector are located in a unit on a fixed mechanical location, usually called split-optics, the beam being transferred between both units, e.g. via a mirror. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The main scanning signal 33 is processed by read processing unit 30 of a usual type including a demodulator, deformatter and output unit to retrieve the information. The control unit 20 comprises control circuitry, for example a microprocessor, a program memory and control gates. The control unit 20 may also be implemented as a state machine in logic circuits.

The device is provided with recording means for recording information on a record carrier of a writable or re-writable type. The recording means include an input unit 27, a formatter 28, a laser unit 29, front-end unit 31 and the head 22 for generating a write beam of radiation. The formatter 28 is for adding control data and formatting and encoding the data according to the recording format, e.g. by adding error correction codes (ECC), synchronizing patterns, interleaving and channel coding. The formatted units comprise address information and are written to corresponding addressable locations on the record carrier under the control of control unit 20. The formatted data from the output of the formatter 28 is passed to the laser unit 29 which controls the laser power for writing the marks in a selected recording layer.

Real-time information from a source device is presented on the input unit 27 that may comprise compression means for input signals such as analog audio and/or video, or digital uncompressed audio/video. Suitable compression means are for example described for audio in WO 98/16014-A1 (PHN 16452), and for video in the MPEG2 standard. The input unit 27 includes a buffer 32 for temporarily storing the real-time information. It is noted that the memory constituting the buffer may also be located elsewhere, e.g. in the control unit 20, and may be shared for other purposes such as reading real-time information. The input unit 27 processes the audio and/or video to units of information, which are passed to the formatter 28. The read processing unit 30 may comprise suitable audio and/or video decoding units.

The device has an interface 34 for transfer of real-time information and control data between a source and the recording means. In particular the interface is coupled to the input unit 27 for transferring real-time information and to the control unit 20 for transferring the control data. The control data include commands according to a predefined protocol as explained below.

In an embodiment the recording device is a storage system only, e.g. an optical disc drive for use in a computer. The control unit 20 is arranged to communicate with a processing unit in the host computer system via a standardized interface.

In an embodiment the device is arranged as a stand alone unit, for example a video recording apparatus for consumer use. The control unit 20, or an additional host control unit included in the device, is arranged to be controlled directly by the user, and to perform the functions of the file management system.

The control unit 20 is arranged for controlling the recording functions for performing seamless recording as described below with reference to FIG. 4. Alternatively the controlling functions for seamless recording may partly be performed in a different processing unit, e.g. in a host computer via a software driver, or via an application software program provided on a data carrier or via a network such as the internet. The control unit 20 is arranged for controlling the recording of the real-time information as usual. According to the invention a control process for seamlessly recording is implemented as follows.

FIG. 4 shows a control process for seamlessly recording. In a first step REC 41 a recording process for real-time information is started. During recording, in a detection loop steps FIN 47, INA 42 and EXC 43 are executed. In step FIN 47 it is detected if the recording function is completed. In step INA 42 an interruption to write information on the record carrier is detected, for example by monitoring the recording process. If an interruption occurs, in step EXC 43 the interruption is classified as an inability to write information if the period exceeds the local real-time information buffering capacity. A type of interruption may be detected, e.g. when data blocks cannot be written to the record carrier, the control unit may be aware by detecting timeouts or other error signals. In particular it is to be predicted if an interruption of the writing function will last longer than can be masked by the available real-time information buffering capacity. For example in step EXC 43 it is detected if the period exceeds a threshold level by monitoring the amount of data in the real-time information buffer 32. The local buffer needs to have sufficient free space to store real-time information still coming in during a response time of the source device after sending a stop command in a next step STOP 44. The prediction may be based on a known or detected data rate, the amount of storage space remaining in the real-time information buffer, an estimate of the time of the interruption based on the type of interruption, etc. For example the detection may be based on a predetermined buffer fullness threshold. If exceeded, in step STOP 44 a stop command is send to the source device via the interface for temporarily interrupting the transfer of real-time information from the source. As a result, the source device will stop transmitting real-time information. It is noted that the device may include a transmission pause detector to identify the moment that real-time information is no longer transmitted or paused. As some source devices may transmit a still picture during a pause mode triggered by the stop command, the pause detector may be equipped with video processing functions to detect the still picture.

In a next step WRIT 45 it is detected if the writing on the record carrier can be continued, i.e. after detecting that said inability has ended, for example because an error recovery process has been completed. If so, in a next step RES 46 a resume command is send to the source for resuming the transfer of real-time information. The recording process is continued in the detection loop of steps FIN 47, INA 42 and EXC 43.

In an embodiment the control process for seamlessly recording is for a recording on a multilayer record carrier. The record carrier comprises at least a first recording layer and a second recording layer, as shown in FIG. 2. The control process, in particular step INA 42, is arranged for said detecting the inability by detecting that a transition from a current writing position of the beam on a current recording layer to next writing position of the beam on a different recording layer has to be performed, for example by detecting that the current layer is almost fully recorded. The transition to a different layer may require at least a known minimum period during which data cannot be written, which period may be known to exceed the local real-time information buffering capacity. Hence the step EXC 43 detects from the type of interruption that the inability period will exceed the real-time information buffering capacity. In particular the control process for seamlessly recording in the event of a layer jump may send the stop command based on detecting that last data has been written on the current recording layer. Furthermore the control process for seamlessly recording may send the resume command based on detecting that the beam is positioned on the next writing position on the different recording layer.

In an embodiment the control process for seamlessly recording on a multilayer record carrier is arranged for performing a calibration process on the second, different layer before said sending the resume command. For example calibration on the second layer is done in a middle area of the disc. Reasons for calibration at a layer jump before start writing to the second layer may include:

Calibration results may differ depending on environmental situation.

Initially, before writing to the first layer, the temperature of the device may be much lower than at the moment of jumping to the second layer, e.g. after many hours of writing to the first layer.

It is noted that while writing to a same layer the temperature and environmental situation may also change, but for that change a so-called 'running OPC', which is an adaptive optimum power control. However running OPC is designed to work as long as recording continues on the same layer, but does not cover switching to a physically different layer. Hence a new calibration for recording parameters such as power may need to be performed on the new layer.

In an embodiment the interface 34 to be coupled to the source device is a digital interface supporting a predefined command set, such as IEEE1394 supporting the AV-C/CTS commands as described in: "TA Document 2001017 AV/C Tape Recorder/Player Subunit Specification 2.2" from the 1394 Trade Association, dated Dec. 11, 2001. The document defines a command set for consumer and professional Tape recorder/player equipment over IEEE Std 1394-1995. The command set makes use of the Function Control Protocol (FCP) defined by IEC61883, proposed standard for Digital Interface for Consumer Electronic Audio/Video Equipment, for the transport of Tape recorder/player command requests and responses. The audio/video devices are implemented as a common unit architecture within IEEE Std 1394-1995. In particular in section 4.15 PLAY command (on page 39,40 and in table 4.23) relevant commands for digital tape recorders are defined. The PLAY commands include play modes FORWARD PAUSE and FORWARD. The FORWARD PAUSE command corresponds to the stop command, whereas the FORWARD command corresponds to the resume command. Note that for this standard, while in pause mode, the same frame is sent repeatedly (i.e. a still picture). Preferably, this frame is ignored by the recording device. The frame repeat may be recognized and discarded based on:

A time code attribute included in control data (called meta data). If a same time code is received as previously: discard the new frame.

A transport mode attribute included in the meta data. If the transport mode indicates pause: discard the new frame In an embodiment the interface 34 to be coupled to the source device is an analog interface circuit for real-time information, e.g. the well known SCART interface supporting a command protocol known commercially as EasyLink or CinemaLink. Via the so-called ISTB command set thereof, the recording device issues commands to pause/resume the input device. Another interface to provide control to an input device is via a so-called IR blaster. The recording device can send IR codes to the input device via the IR blaster.

In an embodiment the source device may not include control data with the real-time information transmitted, thereby lacking an indication of pause mode or type of data transfer. While in pause, the source device may repeatedly display the same image. Preferably, this image is ignored by the recording device. Options to detect this situation are:

Simply ignore all input after sending the command to stop the source device (i.e. pausing input device). In an additional period after sending the command real-time information may still be accepted. This may result in a short freeze during playback, but no data is lost Comparing the real-time information, e.g. video comparison with hardware processing support. This may result in a seamless link, i.e. no freeze. There may be a (coincidental) case that an intentionally repeated image is skipped. However, the probability thereof seems to be very low, in particular when the comparing is activated only after sending the stop command.

In an embodiment the control process for seamlessly recording is arranged for said detecting the inability by detecting that write errors have occurred. Write errors may result in writing the same data again on a different location, or in adding some defect management data to a defect management area on a predefined location on the record carrier. Hence for recovering from the write errors an error recovery process is performed, which process requires a recovery period that blocks writing of real-time information. When the recovery period exceeds the local real-time information buffering capacity, the source device is to be paused as described above.

In an embodiment the control process for seamlessly recording is arranged for said sending the stop command based on detecting buffer fullness of the real-time information buffer. It is noted that the amount of data in the real-time information buffer 32 normally varies, e.g. due to variations in transfer rate or data rate. However, the detection of inability to write may be derived from detecting that the real-time information buffer is filled to above a predetermined threshold. Similarly, the detection of end of the inability to write may be derived from detecting that a filling level of the real-time information buffer goes below a predetermined threshold. It is noted that by detecting the buffer fullness the seamless recording process may be independent of the actual reason of the inability to write. Alternatively, the monitoring of the buffer fullness may be made dependent on the fact that a particular type of interruption of the writing has already been established. For example, only during a defect management process the real-time information buffer fullness is monitored, the source device being paused if both conditions apply.

Although the invention has been mainly explained by embodiments using dual layer optical discs having spiral shaped tracks, the invention is also suitable for other record carriers such as rectangular optical cards, magneto-optical discs, magnetic discs or any other type of information storage system that may suffer from interruptions in writing capability, e.g. due to a multitude of recordable layers. Furthermore the proposed methods can also be applied when a single large amount of video content formatted according to predefined video specifications is available on a source device (e.g. HDD), and has to be copied to a dual-layer recordable disc. For example DVD-Video content might have been created by a software tool, or might have been copied earlier from a dual-layer DVD-Video disc.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for recording real-time information on a record carrier in a track on a recording layer via a beam of radiation, the device comprising, recording means for recording real-time information, which recording means include a head (22) for providing the beam of radiation and a real-time information buffer (32), an interface (34) for transfer of real-time information and control data between a source and the recording means, the control data including commands, and a control unit (20) for, while recording the real-time information, detecting an inability to write information on the record carrier for a period exceeding a local real-time information buffering capacity of the real-time information buffer, sending a stop command to the source for temporarily interrupting the transfer of real-time information from the source, and sending a resume command to the source for resuming the transfer of real-time information after detecting that said inability has ended.

2. Device as claimed in claim 1, wherein the record carrier comprises at least a first recording layer (40) and a second recording layer (41), and the control unit (20) is arranged for said detecting the inability by detecting that a transition from a current writing position of the beam on a current recording layer to next writing position of the beam on a different recording layer has to be performed, which transition requires a period exceeding the local real-time information buffering capacity.

3. Device as claimed in claim 2, wherein the control unit (20) is arranged for said sending the stop command based on detecting that last data has been written on the current recording layer, and/or for said sending the resume command based on detecting that the beam is positioned on the next writing position on the different recording layer.

4. Device as claimed in claim 2, wherein the control unit (20) is arranged for performing a calibration process on the different layer before said sending the resume command.

5. Device as claimed in claim 1, wherein the control unit (20) is arranged for said detecting the inability by detecting that write errors have occurred which require an error recovery process, which process requires a period exceeding the local real-time information buffering capacity.

6. Device as claimed in claim 1, wherein the control unit (20) is arranged for said sending the stop command based on detecting buffer fullness of the real-time information buffer above a predetermined threshold.

7. Device as claimed in claims 1, wherein the control unit (20) is arranged for said sending the resume command based on detecting buffer fullness below a predetermined threshold.

8. Method of recording real-time information from a source on a record carrier in a track on a recording layer via a beam of radiation, the method comprising detecting, while recording the real-time information, an inability to write information on the record carrier for a period exceeding a local real-time information buffering capacity, sending a stop command to the source for temporarily interrupting transfer of real-time information from the source, and sending a resume command to the source for resuming the transfer of real-time information after detecting that said inability has ended.

9. Method as claimed in claim 8, wherein the record carrier comprises at least a first recording layer (40) and a second recording layer (41), and said detecting the inability comprises detecting that a transition from a current writing position of the beam on a current recording layer to next writing position of the beam on a different recording layer has to be performed.

10. Tangible storage media for electronic reading and recording information, containing a program encoded as variations in physical properties of the media, which program is operative to cause a processor to perform the method as claimed in claim 8.

* * * * *